Nov. 25, 1952     R. C. WILLMAN     2,619,526
SYNCHRO OVERLOAD INDICATOR
Filed Aug. 29, 1946     3 Sheets—Sheet 1

INVENTOR.
Richard C. Willman
BY
ATTORNEY.

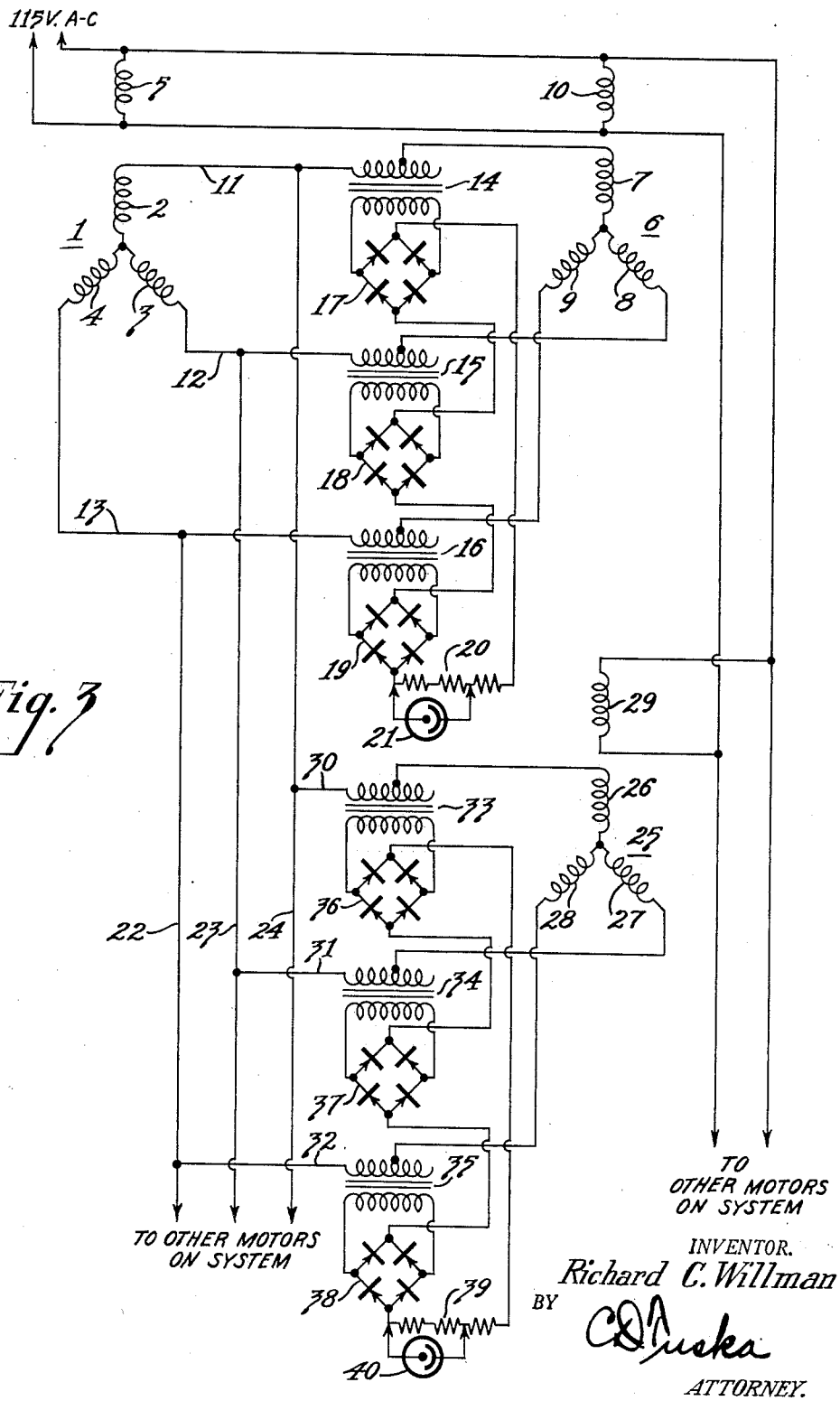

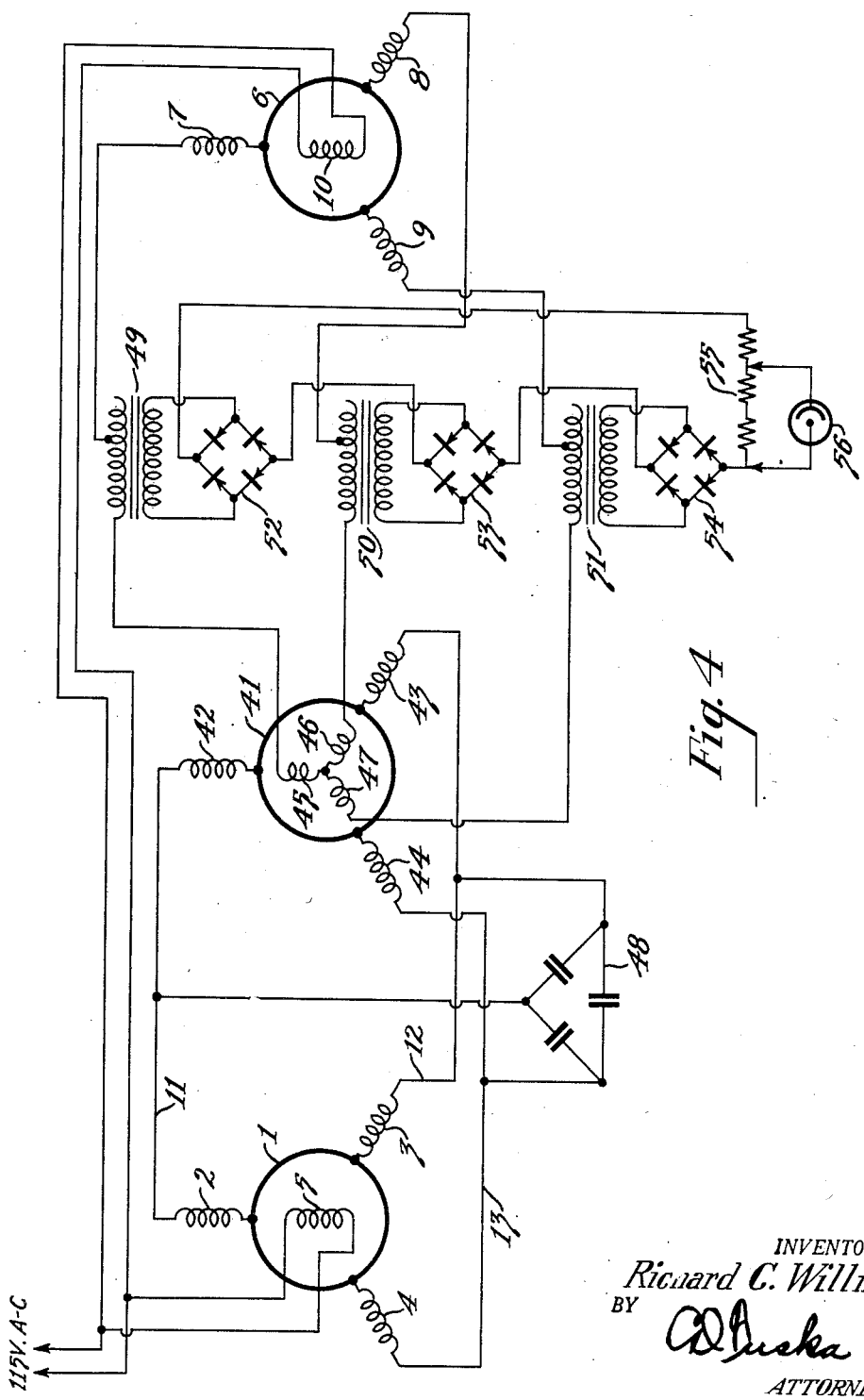

Patented Nov. 25, 1952

2,619,526

UNITED STATES PATENT OFFICE 2,619,526

SYNCHRO OVERLOAD INDICATOR

Richard C. Willman, Indianapolis, Ind., assignor to Radio Corporation of America, a corporation of Delaware Application August 29, 1946, Serial No. 693,776

7 Claims. (Cl. 177—311)

This invention relates to improvements in overload indicators to be used with synchro motor-generator systems.

By a synchro motor-generator system is meant one in which an angular movement imparted to the rotor of a generator results in a corresponding movement in the rotor of an associated motor. In this type of system, a generator usually having three rotor or stator windings has each winding connected to a corresponding rotor or stator winding of one or more associated motors. Power is supplied to the stator or rotors of both generator and motors from a common A.-C. source.

These synchro systems have proven very useful in remote control work. For example, they have been widely used in directing fire of gun batteries from observation stations, in keeping ocean liners on course, and in many industrial applications where it is desired to duplicate a movement at some distance from a control point.

In any system of this type, faults of operation may occur. The rotor of the motor may become corroded or jammed or be made to work against too heavy a load or some other situation may arise which causes the rotor of the motor to lag behind the rotor of the generator. When such faults occur, it is desirable that suitable indication be given to the operator so that he may investigate the source of trouble.

It is an object of the present invention, then, to provide a reliable means and method of indicating when an overload occurs in a synchro motor-generator system.

A further object is to provide a means of indicating when a motor is not in synchronism with a generator in a synchro system so that any information being transferred will be known to be in error.

Another object is to provide a means of indicating when a motor is at fault in a synchro system so that it may be disconnected from the system in order not to introduce error into the positioning of the remaining motors which may be controlled from the same generator.

Another object is to provide a synchro overload indicating means which can be adjusted to accommodate various sizes of motors and generators.

Still another object is to provide a means and method of indicating when a motor is not in synchronism with a generator in a synchro system, which method and means are independent of the direction of angular displacement of the rotors.

These and other objects will be more apparent from the description of the invention which follows and from the accompanying drawings of which, Fig. 1 is a simplified circuit diagram of a typical synchro motor-generator system in which the rotors of both generator and motor are in perfect synchronism. No overload indicator is present.

Fig. 3 is a simplified circuit diagram of a synchro system having the present invention applied in a situation where there are a plurality of motors controlled by the same generator.

Fig. 4 is a circuit diagram of a synchro system showing how the indicator is connected with a differential motor in the system.

Figure 1:
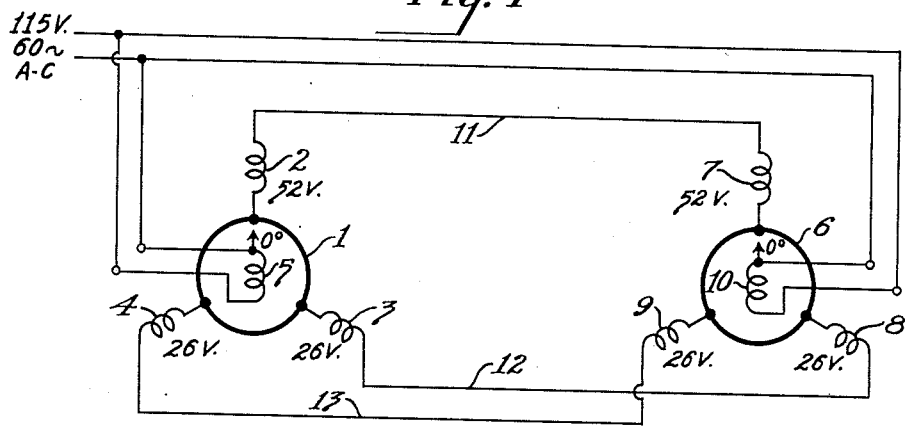

Referring to Fig. 1, a generator 1 is shown having stator windings 2, 3 and 4 and rotor winding 5. The rotor takes current from the 115 v. A. C. supply mains. Associated with the generator and controlled by it is a motor 6 similar in construction to the generator. It also has three stator windings 7, 8, and 9 and a rotor 10 which takes current from the same 115 v. A. C. mains. The corresponding stator windings of the generator and of the motor are directly connected through the leads 11, 12, and 13, respectively. The construction of the generator and the motor is very similar. In order to prevent the motor from getting into uncontrolled oscillation, however, its rotor is usually provided with a heavy flywheel. This flywheel is mounted so that it can turn freely on the rotor shaft for 45° or so, and then it runs into a stop which is also fastened to the shaft through a friction disc. This arrangement permits it to turn on the shaft but with a high degree of friction. The flywheel does not interfere with slow angular movements of the shaft but it does prevent rapid oscillation or spinning.

A system of this type is not like the usual motor-generator system in which the rotors of the generator and motor spin rapidly in unison. In the synchro system some angular displacement, often less than 360°, is imparted to the shaft of the generator, either mechanically or with a hand-set so that the rotor of the motor will undergo a corresponding movement. The rotor of the controlled motor does not necessarily turn in the same direction as that of the generator. The two may be connected so that movement is in opposed directions.

The synchro installations may employ two speed systems, fast and slow. In this type of system, a second or high speed generator is directly coupled to the low speed generator in the ratio of 36 or 72 to one. The high speed unit then rotates 36 or 72 times for every single revolution of the low speed generator. There are also a high and a low speed motor at the receiving end.

With alternating current flowing in the rotor windings of the generator and motor, there will be an induced voltage set up in the stator windings. For each winding, this voltage will be dependent upon the position of the rotor with respect to that winding. For the condition shown in Fig. 1 in which the rotors 5 and 10 are lined up with the windings 2 and 7 of the generator and motor respectively, the voltage induced in the stator windings will be about 52 v. In any given situation, this voltage will depend upon relative number of turns in the windings and closeness of coupling. The condition illustrated in Fig. 1 is one in which the rotor winding is just halfway between two stator windings. Hence, the voltage induced in each of them will be about 26 v. This is true of both the generator and the motor.

It is thus seen that when the rotors of both generator and motor are synchronized in the illustrated position, the voltages in each winding of the generator are equal to the voltages in each corresponding winding of the motor. Since the voltages are both equal and have the same polarity, no current flows in any of the stator leads. It would be found that the same result would obtain no matter what the position of the rotors providing they were in synchronized alignment.

Figure 2:
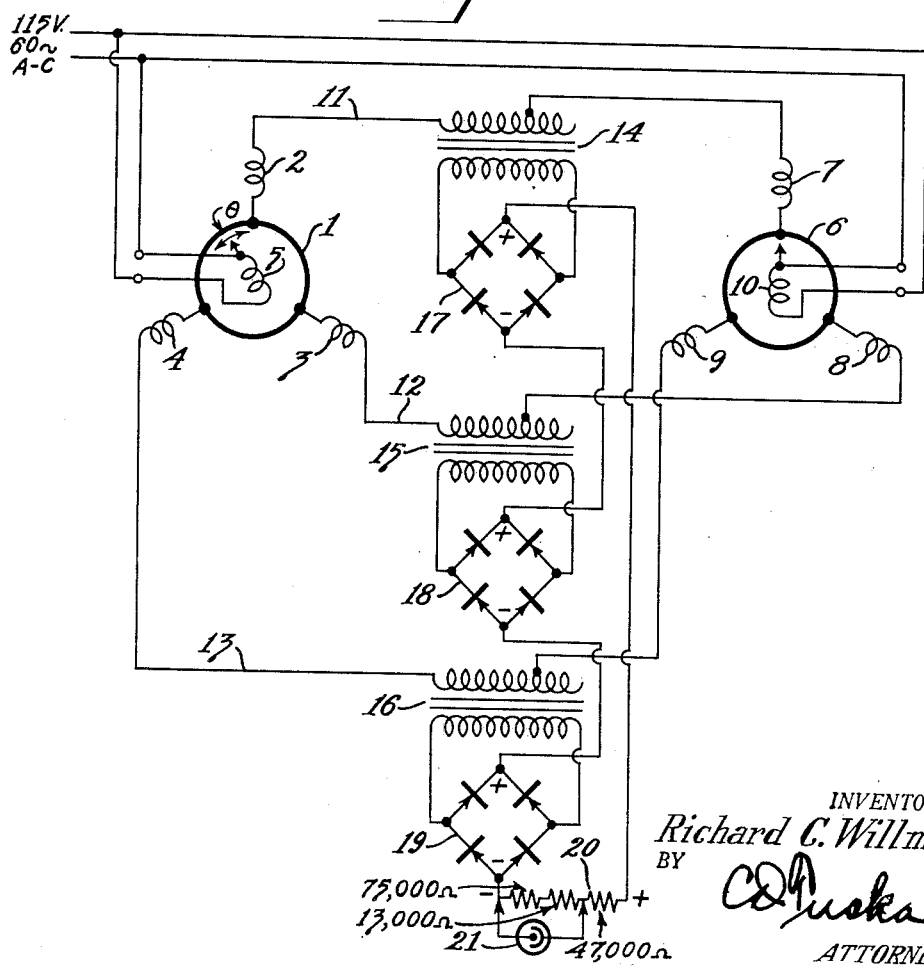
Fig. 2 is a circuit diagram somewhat similar to that of Fig. 1 but illustrating conditions which are typical when the rotors of generator and motor are angularly displaced. The use of the overload indicator of the present invention is also illustrated in this figure.

An unstable condition in which current does flow in the stator leads is shown in Fig. 2. Let it be assumed here that the shaft and rotor coil 10 of the motor are held on 0° while the rotor coil 5 of the generator is given an angular displacement of 30°. For this situation, the potential induced in each of windings 2 and 3 of the generator will be about 45 v. while that in coil 4 will be zero since the rotor coil will be perpendicular to it. Due to the differences in potential now existing in each of the three pairs of stator coils current will flow in each of the stator leads 11, 12, and 13.

The condition shown in Fig. 2 also represents a condition of overload in the system which should should be brought to the attention of the operator. According to the present invention, this is done in the following manner. In each of the stator leads 11, 12, and 13 are connected the primaries of transformers 14, 15, and 16, respectively. The output of the secondaries of each of these transformers is applied to full wave rectifiers 17, 18, and 19, respectively. These rectifiers may be of the selenium type or of any one of several other well known types, such as the copper oxide or vacuum tube. Less satisfactorily, since indicator lamp brightness is not as great, a half-wave rectifier may be used.

The output of the three rectifiers is preferably connected in series although it may be in parallel and the total output is applied to a tapped resistance load 20. A neon lamp 21 is bridged across a part or all of this resistance. This neon lamp may be one which glows when a potential of 74 v. is applied to it. Glowing of the lamp is an indication of the presence of an overload which in turn is due to a predetermined angular displacement between the rotors of the generator and motor. In this case, the allowable displacement may be 17°±3°.

In order to use the device with various sized motors and generators, the tapped resistance and transformer primaries are provided. The larger the rating of the generator or motor the less sensitivity in setting the tap connections is required in order to operate the calibrated neon lamp.

Unlike previous systems which have been used, the indicating system of the present invention works very well when one large generator is used to control the operation of several smaller motors. This is the situation illustrated in Fig. 3.

The generator 1, the motor 6, and the indicator consisting of the transformers 14, 15, and 16, the rectifiers 17, 18, and 19, the resistance 20 and the neon lamp 21 are connected exactly as described above and as shown in Fig. 2. The stator windings 26, 27, and 28 of the second motor 25 are then connected through main leads 22, 23, and 24, respectively, and secondary leads 30, 31, and 32 in parallel with corresponding stator windings 7, 8, and 9 of motor 6. The rotor 29 of the second motor 25 is also connected in parallel with rotor 10 of the first motor 6. Another indicator unit is connected between the generator 1 and motor 25 with the tapped primaries of each of the transformers 33, 34, and 35 connected into the leads associated with each of the stator windings 26, 27, and 28. The secondaries of each of the transformers are each connected to one of the rectifiers 36, 37, or 38 and the rectifiers are connected in series as shown although they may be connected in parallel. A tapped resistance 39 is connected across all three rectifiers and a neon indicator lamp 40 is bridged across a selected part of this resistance. It will be noted that the connections to the indicator unit are the same as when only one motor was used as shown in Fig. 2. Additional motors and indicators may be connected in the same fashion.

If the zero position of the rotors 5 and 10 is arbitrarily taken as indicated in Fig. 1 with the rotor coil aligned with stator windings 2 and 7, respectively, any angular position of the rotor coil with respect to zero may be called $\theta$. This is shown in Fig. 2 where, in the case of generator 1, $\theta = 30°$. When the generator and motors are of different sizes, even with the rotors of the generator and motor in synchronism (not as shown in Fig. 2), circulating currents flow because of the difference in loading and the fact that the impedances of the generator and motors are not the same. The total of the circulating currents in the three legs is zero but when added up using rectifiers so that the polarity is of no consequence, the total circulating current is a constant value for any value of $\theta$ for a particular combination of generator and motor.

As explained previously, when the two rotors are not in synchronism, another current is present which may be called the operating current. This is proportional to the angle of displacement $\alpha$ (also 30° in Fig. 2) between the rotors of the generator and the motor. In the case of the present invention, this operating current is always superimposed on the circulating current and is always additive to it regardless of whether the displacement angle is clockwise or counter-clockwise. This condition was not true in the case of overload indicators of previous design. In these older type indicators, transformers were merely placed in two of the stator leads and their output voltages were added at an angle of 60° to get a constant voltage for all values of $\theta$ between 0 and 360° when $\alpha$ was 17° clockwise or counterclockwise. Since the circulating current in only two legs was taken into account, it was additive to the operating current for one direction of angular displacement and subtractive for the opposite direction of angular displacement. This type of indicator was not capable of indicating displacement angles of the required standard 17°±3° for all values of $\theta$ because of the circulating currents which exist where generator and motors are considerably different in size.

In one practical application of the present device, step-up transformers are used having a ratio of secondary to primary of 70.2:1. The primaries have 12 taps with ratio between the secondary and first tap of 333:1. Selenium full wave rectifiers are used. The three sections of the load resistance are made equal to 75,000 ohms, 13,000 ohms, and 47,000 ohms. The neon bulb is a ¼ watt type which flashes at 74 v.

The improved indicators of the present invention can also be used in synchro systems which include differential motors. A differential motor as used in this type of system has three stator windings and also three rotor windings as well. Its operation is analogous to that of a mechanical differential. With the differential motor connected between the synchro generator and an ordinary synchro motor as shown in Fig. 4, the shaft position of the motor is equal to the position of the rotor shaft of the generator minus the position of the rotor of the differential motor. The system can also be connected so that other relationships exist between generator, differential, and motor.

The method of connecting the indicator is shown in Fig. 4. In this figure, 1 and 6 are the synchro generator and motor as previously described. Into this system is now introduced a differential motor 41 having stator windings 42, 43, and 44 and rotor windings 45, 46, and 47. As is usual in this type of system a triad of capacitors 48 is connected between the stator windings of generator and differential motor. Each of the rotor windings 45, 46, and 47 of the differential are connected through the primaries of the indicator transformers 49, 50, and 51 to the corresponding stator windings 7, 8, and 9 of the motor. The rectifiers 52, 53, and 54 are connected, as before, across the secondaries of each of the transformers, a resistance 55 is connected across the rectifiers with a neon lamp 56 bridging all or part of this resistance. The rotor of the differential is set at any desired angle with respect to the rotor of the generator and if the rotor of the motor varies more than about 17° from the position it should occupy with respect to the rotor of the generator the indicator lamp 56 glows and thus warns the operator.

The indicator can, of course, be set for different sensitivities by selection of different turns ratio for the transformers, changing the method of combination of the rectifiers, adjusting the resistance load and by varying the portion of the load across which the indicating lamp is bridged. The 17° angle is practical since a smaller angle would require the device to be so sensitive that it would respond to spurious indications of overload while the generator was being rotated at ordinary speeds. When the generator is turned unusually fast, the motor normally lags to a greater extent temporarily and although no overload indication is necessary, since this is simply a characteristic of normal operation, an indicator which was very sensitive would give a spurious indication to the operator.

On the other hand, if the critical angle were chosen much greater than 17°, the unit would be so insensitive that serious overload could occur without an indication.

In these systems, the stators of both the generator and motor may have a single winding while the rotors may consist of three windings. The reverse form in which the multiple windings are in the stators is more common and has been shown in the figures.

There has thus been described a simple but effective improved overload indicator for synchro systems which is dependable and accurate besides being easy to install and service. It is independent of the direction of displacement and not influenced by the circulating currents present in the system.

I claim as my invention:

1. In a synchro motor-generator system having certain windings of the generator connected to corresponding windings of the motor, apparatus for indicating when the motor is a predetermined number of degrees out of phase with its driving generator, said apparatus comprising means connected in each of the leads joining the generator windings to their respective motor windings for multiplying any voltage output which is due to a potential difference existing between each of said winding pairs, means for rectifying each of said multiplied voltage outputs, indicating means connected across the combined outputs of said rectifying means, and adjustable means for rendering said indicating means operative whenever said motor becomes said predetermined number of degrees out of phase with said generator.

2. Apparatus of claim 1 in which said windings are stator windings.

3. In a synchro motor-generator system having each stator winding of the generator connected to a corresponding stator winding of at least one motor and having the motor and generator rotors connected to a common alternating current supply, apparatus for indicating when any of the motors is a predetermined number of degrees out of phase with the generator, said apparatus comprising means connected in each of the leads joining the generator stator windings to their respective motor stator windings for multiplying any voltage output which is due to a potential difference existing between each of said winding pairs, means for rectifying each of said multiplied voltage outputs, means for combining the voltage outputs of the multiplying means associated with each motor, indicating means connected across each of said combined outputs, and adjustable means for rendering each of said indicating means operative whenever the motor associated therewith becomes said predetermined number of degrees out of phase with said generator.

4. In a synchro motor-generator system having each stator winding of the generator connected to a corresponding stator winding of a motor and having the motor and generator rotors connected to a common A.-C. supply, apparatus for indicating when the motor is a predetermined number of degrees out of phase with the generator, said apparatus comprising transformers each having a primary connected in a lead joining a generator stator winding to its respective motor winding, rectifying means connected to the secondaries of each of said transformers, indicating means connected across the combined outputs of said rectifying means, and adjustable means for rendering said indicating means operative whenever said motor becomes said predetermined number of degrees out of phase with said generator.

5. In a synchro motor-generator system having each stator winding of the generator connected to a corresponding stator winding of a motor and having the motor and generator rotors connected to a common A.-C. supply, apparatus for indicating when the motor is a predetermined number of degrees out of phase with the generator, said apparatus comprising transformers each having a tapped primary connected in a lead joining a generator stator winding to its respective motor winding, rectifying means connected to the secondaries of each of said transformers, load means connected across the combined outputs of said rectifying means, and means for indicating when the voltage across at least a part of said load has exceeded a predetermined amount.

6. Apparatus of claim 5 in which said rectifying means are full-wave selenium rectifiers.

7. In a synchro motor-generator system having a differential connected between stator windings of the generator and the corresponding stator windings of said motor, apparatus for indicating when said motor is a predetermined number of degrees out of a certain phase relationship with its driving generator, said apparatus comprising means connected in each of the leads joining the rotor windings of said differential to the corresponding windings of said motor for multiplying any voltage output which is due to a potential difference existing between said winding pairs, means for combining said multiplied voltage outputs, means for rectifying each of said multiplied voltage outputs, indicating means connected across the combined outputs of said rectifying means, and adjustable means for rendering said indicating means operative whenever said motor becomes said predetermined number of degrees out of said certain phase relationship.

RICHARD C. WILLMAN.

REFERENCES CITED

The following references are of record in the file of this patent:

UNITED STATES PATENTS

| Number | Name | Date |
|---|---|---|
| 1,576,189 | Hewlett et al. | Mar. 9, 1926 |
| 1,888,718 | Friedlander | Nov. 22, 1932 |
| 2,388,977 | Johnson | Nov. 13, 1945 |
| 2,439,414 | Agins | Apr. 13, 1948 |